United States Patent
Chiu et al.

(10) Patent No.: US 11,934,171 B2
(45) Date of Patent: Mar. 19, 2024

(54) SERVO MOTOR AND ENCODER CALIBRATION METHOD THEREOF

(71) Applicant: INDUSTRIAL TECHNOLOGY RESEARCH INSTITUTE, Hsinchu (TW)

(72) Inventors: Chih-Kai Chiu, Kaohsiung (TW); Bo-Ting Yeh, Taipei (TW); Tsan-Huang Chen, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 221 days.

(21) Appl. No.: 17/712,372

(22) Filed: Apr. 4, 2022

(65) Prior Publication Data
US 2023/0205165 A1 Jun. 29, 2023

(30) Foreign Application Priority Data
Dec. 28, 2021 (TW) .................. 110149190

(51) Int. Cl.
*H02K 11/20* (2016.01)
*G01D 18/00* (2006.01)
(Continued)

(52) U.S. Cl.
CPC ............ *G05B 19/4015* (2013.01); *G05B 2219/34013* (2013.01); *G05B 2219/41095* (2013.01)

(58) Field of Classification Search
CPC ...... G05B 19/4015; G05B 2219/34013; G05B 2219/41095; H02K 11/20; H02K 11/21; G01D 5/2448; G01D 18/001; G01D 18/00
See application file for complete search history.

(56) References Cited

U.S. PATENT DOCUMENTS

| 7,026,779 B2 | 4/2006 | Eba |
| 7,746,023 B2 * | 6/2010 | Ajima .................. G01D 5/2046 318/700 |

(Continued)

FOREIGN PATENT DOCUMENTS

| CN | 107078668 A | 8/2017 |
| CN | 109708681 A | 5/2019 |

(Continued)

OTHER PUBLICATIONS

Taiwanese Office Action and Search Report for Taiwanese Application No. 110149190, dated Jul. 13, 2022.

(Continued)

*Primary Examiner* — Thai T Dinh
(74) *Attorney, Agent, or Firm* — Birch, Stewart, Kolasch & Birch, LLP

(57) ABSTRACT

The present disclosure discloses a servo motor and an encoder calibration method. The encoder calibration method includes: calculating a gain error, an offset error and a phase error, by an error calculation block, according to a first signal and a second signal output by an encoder; calculating at least one gain calibration parameter, at least one offset calibration parameter and at least one phase calibration parameter, by the error calibration block, according to the gain error, the offset error and the phase error; and calibrating sequentially, by the encoder, the gain, the offset and the phase of the first signal and the second signal according to the at least one gain calibration parameter, the at least one offset calibration parameter and the at least one phase calibration parameter, wherein performing at least one gain calibration and offset calibration after the phase calibration is completed.

10 Claims, 6 Drawing Sheets

(51) Int. Cl.
     *G05B 19/401*     (2006.01)
     *H02K 11/21*      (2016.01)

(56) References Cited

U.S. PATENT DOCUMENTS

| | | | |
|---|---|---|---|
| 11,397,098 B2 * | 7/2022 | Janisch | G01D 5/2053 |
| 2017/0237375 A1 * | 8/2017 | Pramod | G01R 19/0092 |
| | | | 318/400.02 |

FOREIGN PATENT DOCUMENTS

| | | | |
|---|---|---|---|
| CN | 110836677 A | | 2/2020 |
| CN | 111106764 A | | 5/2020 |
| CN | 111174819 A | | 5/2020 |
| CN | 113574792 A | * | 10/2021 |
| CN | 113574792 A | | 10/2021 |
| EP | 0 361 222 B1 | | 5/1995 |
| TW | 201406041 A | | 2/2014 |
| TW | I481184 B | | 4/2015 |
| WO | WO 2018/145647 A1 | | 8/2018 |

OTHER PUBLICATIONS

Lee et al., "Encoder Calibration Method for High Precision Servo Systems With a Sinusoidal Encoder", IEEE Transactions on Industrial Electronics, Jan. 2022, vol. 69, No. 1, pp. 752-762.

\* cited by examiner

SERVO MOTOR AND ENCODER CALIBRATION METHOD THEREOF

CROSS-REFERENCE TO RELATED APPLICATIONS

This non-provisional application claims the priority benefits under 35 U.S.C. § 119(a) of Taiwan Patent Application No. 110149190, filed on Dec. 28, 2021, the entire contents of which are hereby incorporated by references.

TECHNICAL FIELD

The present disclosure relates to a servo motor and encoder calibration method thereof.

BACKGROUND

Servo motors are often used in precision control systems. One of the factors that determines whether the control of the servo motor is accurate is whether the calibration of the encoder is timely and correct. Encoder calibration usually targets three parameters: gain, offset, and phase. Traditional encoder calibration usually calibrates the phase after calibrating the gain and offset. However, the traditional method encounters problems that the calibration cannot converge and the calibrated gain and/or offset changes after the phase is calibrated. Failure to converge the calibration will cause the calibration time to be lengthened and not timely enough. After the phase is calibrated, the gain and/or offset that have been calibrated will change, which will cause the calibration result to be inaccurate and affect the control accuracy of the servo motor. In view of this, it is necessary to improve the encoder calibration method of the servo motor.

SUMMARY

The embodiment of the present disclosure discloses an encoder calibration method for servo motors. Encoder calibration method includes: calculating a gain error, an offset error and a phase error, by an error calibration block, according to a first signal and a second signal output by an encoder; calculating at least one gain calibration parameter, at least one offset calibration parameter, and at least one phase calibration parameter according to the gain error, the offset error, and the phase error by the error calibration block; and performing calibration sequentially, by the encoder, on gain, offset error and phase of the first signal and the second signal according to the at least one gain parameter, the at least one offset calibration parameter, and the at least one phase calibration parameter, wherein performing at least one gain calibration and one offset calibration after the phase calibration is completed.

Another embodiment of the present disclosure discloses a servo motor. The servo motor includes a motor, an encoder, and a driving circuit. The motor includes a detecting means for detecting a rotation information of the motor; an encoder coupled to the motor for generating a first signal and a second signal according to the rotation information; and a driving circuit includes an error calibration block, coupled to the encoder, configured to calculate a gain error, an offset error and a phase error according to the first signal and the second signal; and calculating at least one gain calibration parameter, at least one offset calibration parameter, and at least one phase calibration parameter according to the gain error, the offset error and the phase error, wherein the encoder sequentially performs calibration on gain, offset, and phase of the first signal and the second signal according to the at least one gain parameter, the at least one offset calibration parameter, and the at least one phase calibration parameter, wherein at least one gain calibration and one offset calibration are performed after the phase calibration is completed.

The foregoing will become better understood from a careful reading of a detailed description provided herein below with appropriate reference to the accompanying drawings.

DETAILED DESCRIPTION

Figure 1:
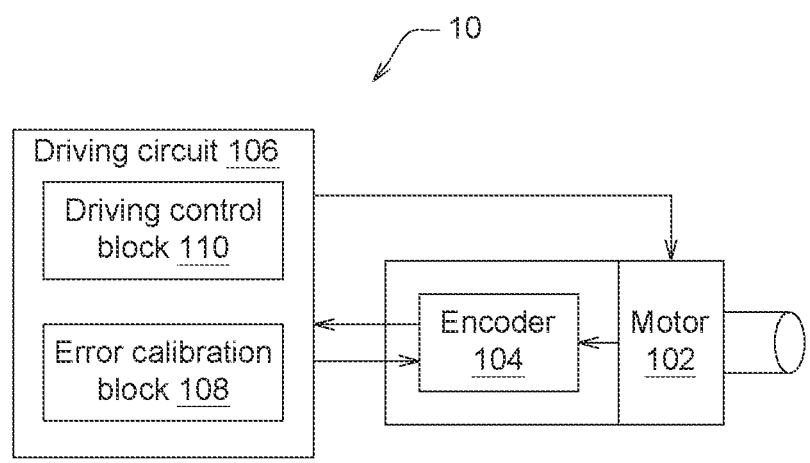
FIG. 1 illustrates a block diagram of a servo motor according to an embodiment of the disclosure.

Please refer to FIG. 1, which illustrates a block diagram of a servo motor according to an embodiment of the present disclosure. The servo motor 10 includes a motor 102, an encoder 104, and a driving circuit 106. The encoder 104 is coupled to the motor 102. The driving circuit 106 is coupled to the motor 102 and the encoder 104.

The motor 102 may include a detection means to detect a rotation information of the motor 102, and transmit the rotation information to the encoder 104 in the form of a signal. The rotation information may include, but is not limited to, the rotation speed of the motor 102 and the rotor address. Generally speaking, the signal including rotation information is a sine wave and a cosine wave. In the rotation information of the motor 102 under normal operation, the gain of the sine wave is equal to the gain of the cosine wave, the offset between the sine wave and the cosine wave is zero, and the phase difference is ninety degrees.

After receiving the rotation information of the motor 102, the encoder 104 generates a first signal corresponding to the sine wave and a second signal corresponding to the cosine wave according to the rotation information, and transmitting the first signal and the second signal to the driving circuit 106. The first signal includes information about the sine wave in the rotation information, and the second signal includes information about the cosine wave in the rotation information. Theoretically, the relationship between the gain, offset, and phase of the sine wave and the cosine wave should be maintained between the first signal and the second signal. However, in reality, there may be errors in gain, offset, and/or phase between the first signal and the second signal generated by the encoder 104.

The driving circuit 106 may include an error calibration block 108 and a driving control block 110. The error calibration block 108 is used to calculate a gain error, an offset error and a phase error according to the first signal and the second signal, and to generate and transmit at least one gain calibration parameter, at least one offset calibration parameter and at least one phase calibration parameter to the encoder 104 according to the gain error, the offset error and the phase error. Specifically, if the driving circuit 106 directly drives and controls the rotation speed and/or address of the motor 102 according to the first signal and the second signal without the encoder 104 being calibrated, the control will not be accurate enough.

The encoder 104 will perform sequentially calibration according to the gain calibration parameters, offset calibration parameters, and phase calibration parameters transmitted from the drive circuit 106 to generate the first signal and the second signal after calibration.

The drive control block 110 of the drive circuit 106 generates a drive signal according to the first signal after calibration and the second signal after calibration to control the speed and/or address of the motor 102.

Figure 2:
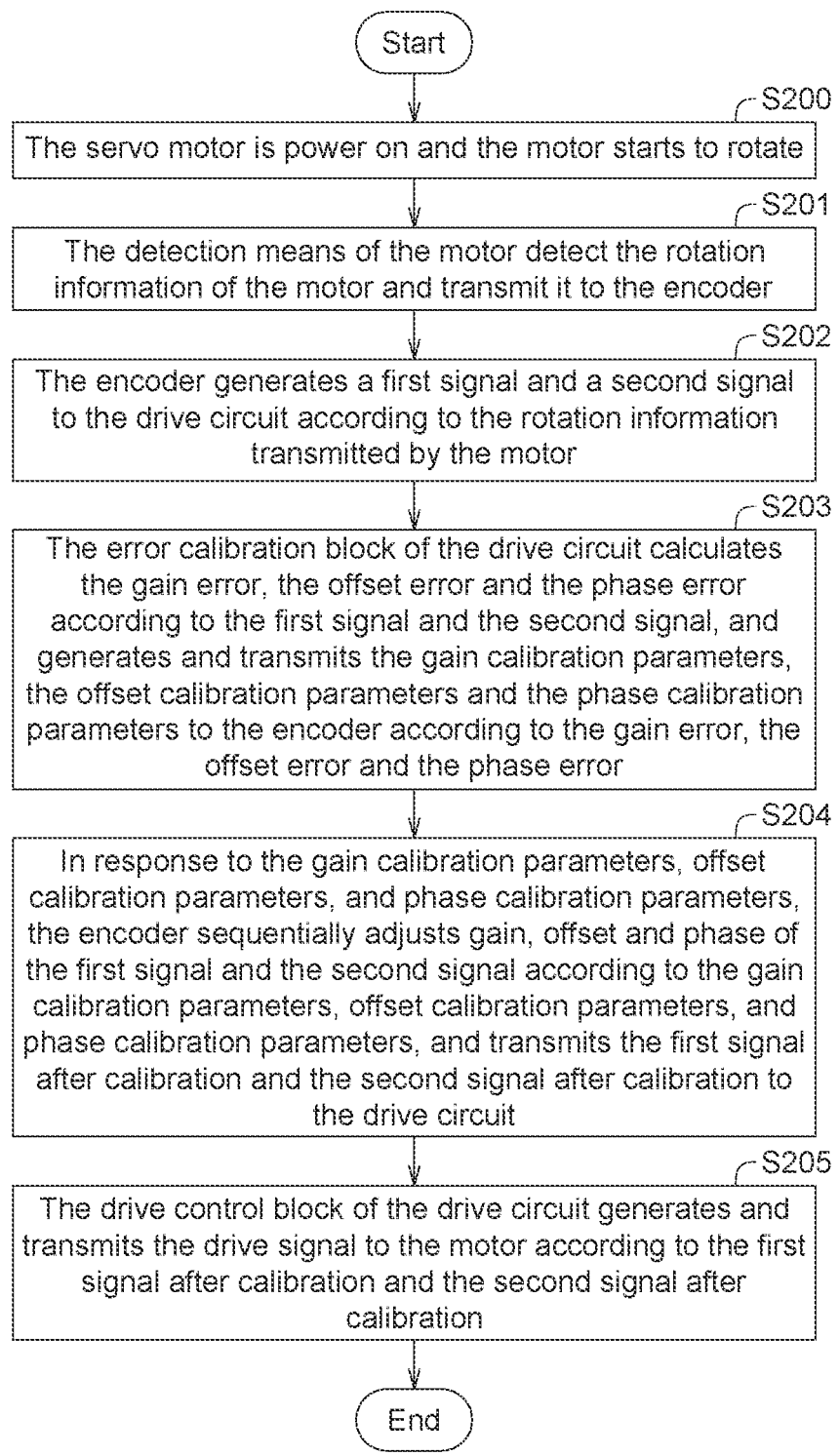
FIG. 2 illustrates a calibration flowchart of a servo motor according to an embodiment of the disclosure.

Please refer to FIG. 2, which illustrates an operation flowchart of a servo motor according to an embodiment of the present disclosure.

In S200, the servo motor is power on and the motor starts to rotate.

In S201, the detection means of the motor detect the rotation information of the motor and transmit it to the encoder.

In S202, the encoder generates a first signal and a second signal to the drive circuit according to the rotation information transmitted by the motor.

In S203, the error calibration block of the drive circuit calculates the gain error, the offset error and the phase error according to the first signal and the second signal, and generates and transmits the gain calibration parameters, the offset calibration parameters and the phase calibration parameters to the encoder according to the gain error, the offset error and the phase error.

In S204, in response to the gain calibration parameters, offset calibration parameters, and phase calibration parameters, the encoder sequentially adjusts gain, offset and phase of the first signal and the second signal according to the gain calibration parameters, offset calibration parameters, and phase calibration parameters, and transmits the first signal after calibration and the second signal after calibration to the drive circuit.

In S205, the drive control block of the drive circuit generates and transmits the drive signal to the motor according to the first signal after calibration and the second signal after calibration. After completing S205, the servo motor completes the start-up process.

Figure 3:
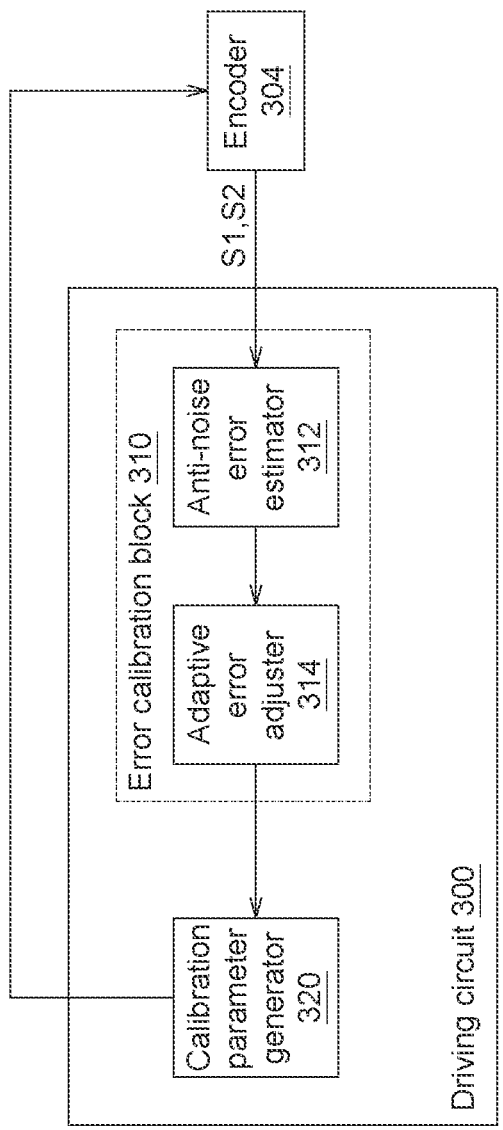
FIG. 3 illustrates a schematic diagram of an error calibration block and an encoder according to an embodiment of the disclosure.

Please refer to FIG. 3, which illustrates a schematic diagram of an error calibration block and the encoder according to an embodiment of the present disclosure. The error calibration block 300 may include an error calibration block 310 and a calibration parameter generator 320. In an embodiment, the error calibration block 310 may include an anti-noise error estimator 312 and an adaptive error adjuster 314.

The anti-noise error estimator 312 may be coupled to the encoder 304 for receiving the first signal S1 and the second signal S2. The anti-noise error estimator 312 can be used to remove the noise of the first signal S1 and the second signal S2, and calculate the gain error offset error and phase error between the first signal S1 and the second signal S2 according to the first signal S1 and the second signal S2. In an alternative embodiment, the anti-noise error estimator may be coupled to the encoder through a data extractor (not shown). The data extractor receives the first signal S1 and the second signal S2, and is used to extract gain, offset, phase of the first signal S1 and the second signal S2. The anti-noise error estimator 312 calculates the gain error, the offset error, and the phase error according to the gain, offset, and phase of the first signal S1 and the second signal S2 provided by the data extractor.

The adaptive error adjuster 314 is coupled to the anti-noise error estimator 312. The adaptive error adjuster 314 can be used to adaptively adjust the gain error, offset error, and phase error detected by the anti-noise error estimator 312 according to environmental parameters and then output.

Environmental parameters refer to some parameters in the environment in which the motor is operating. In different embodiments, different environmental parameters may be used. For example, in some embodiments, the environmental parameters may be temperature and humidity.

The calibration parameter generator 320 is coupled to the error calibration block 310. The calibration parameter generator 320 is used for generating gain calibration parameters, offset calibration parameters, and phase calibration parameters according to the gain error, offset error, and phase error. These gain calibration parameters, offset calibration parameters, and phase calibration parameters are transmitted to the encoder 304.

Figure 4:
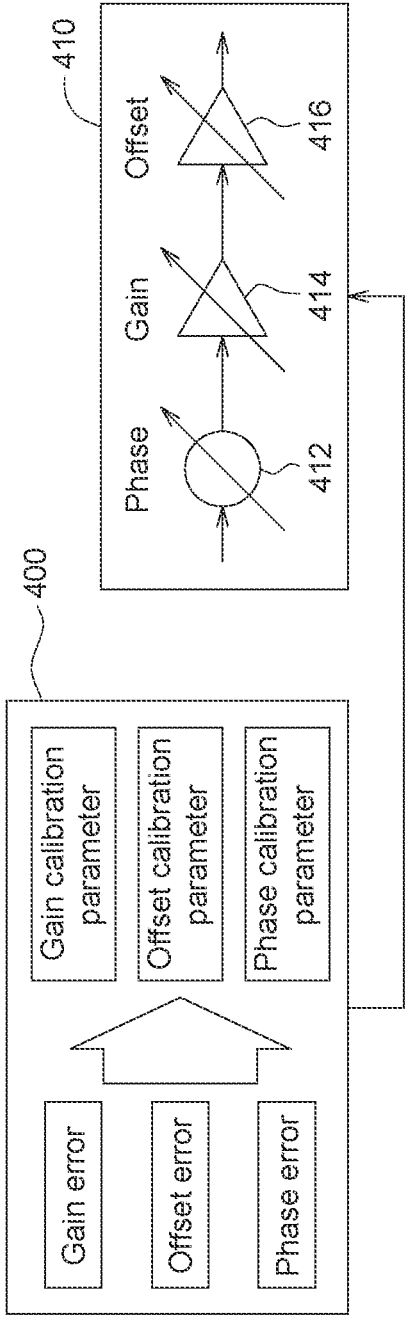
FIGS. 4-7 illustrates schematic diagrams of the calibration parameter generator and encoder according to an embodiment of the present disclosure.

Please refer to FIG. 4, which illustrates a schematic diagram of a calibration parameter generator and an encoder calibration according to an embodiment of the present disclosure. In this embodiment, the error calculator 400 generates and transmits a gain calibration parameter, an offset calibration parameter, and a phase calibration parameter to the encoder 410 according to the gain error, the offset error, and the phase error. The encoder 410 performs sequentially the phase calibration 412, the gain calibration 414, and the offset calibration 416 of the first signal S1 and the second signal S2 in response to the gain calibration parameter, the offset calibration parameter, and the phase calibration parameter.

It should be noted that the order of calibrating gain, offset, and phase is very critical. Generally speaking, when calibrating the phase, if at least one gain and/or offset calibration has been performed, the adjusted gain and/or offset will be changed. Conversely, when calibrating the gain and offset, if the phase has been calibrated, the adjusted phase will not change. This means that the phase calibration must be completed before the gain and offset calibration is completed. Otherwise, calibrating the phase will cause the gain and/or offset that has been calibrated to change and deviate from the calibrated value. Therefore, after the phase calibration is completed, it is necessary to perform at least one gain calibration and one offset calibration.

Figure 5:
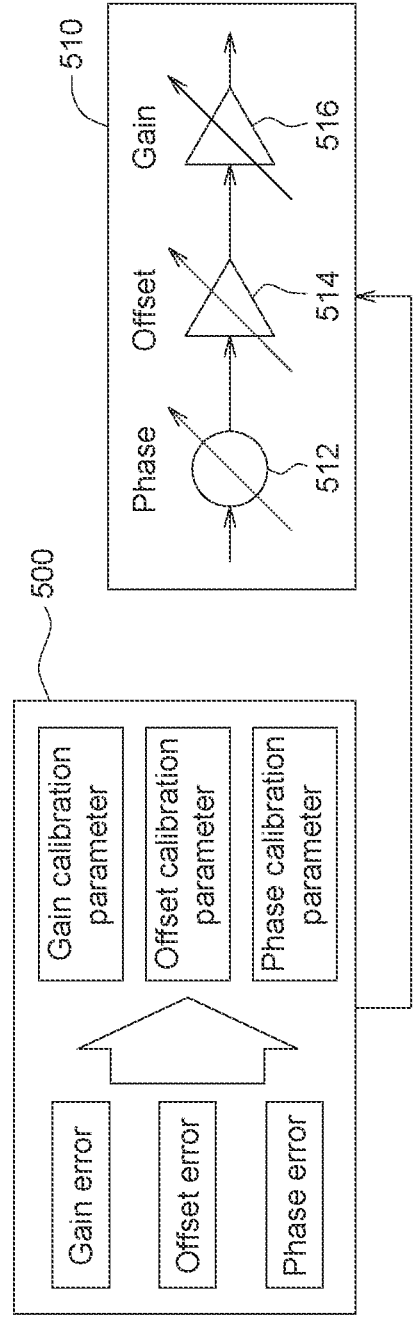

Please refer to FIG. 5, which illustrates a schematic diagram of a calibration parameter generator and an encoder calibration according to another embodiment of the present disclosure. The difference from the embodiment in FIG. 4 is that the encoder 510 performs sequence according to the gain calibration parameter, offset calibration parameter, and phase calibration parameter transmitted by the calibration parameter generator 500 is phase calibration 512 and offset calibration 514, and gain calibration 516. In other words, offset calibration and gain calibration can be reversed in order.

Figure 6:
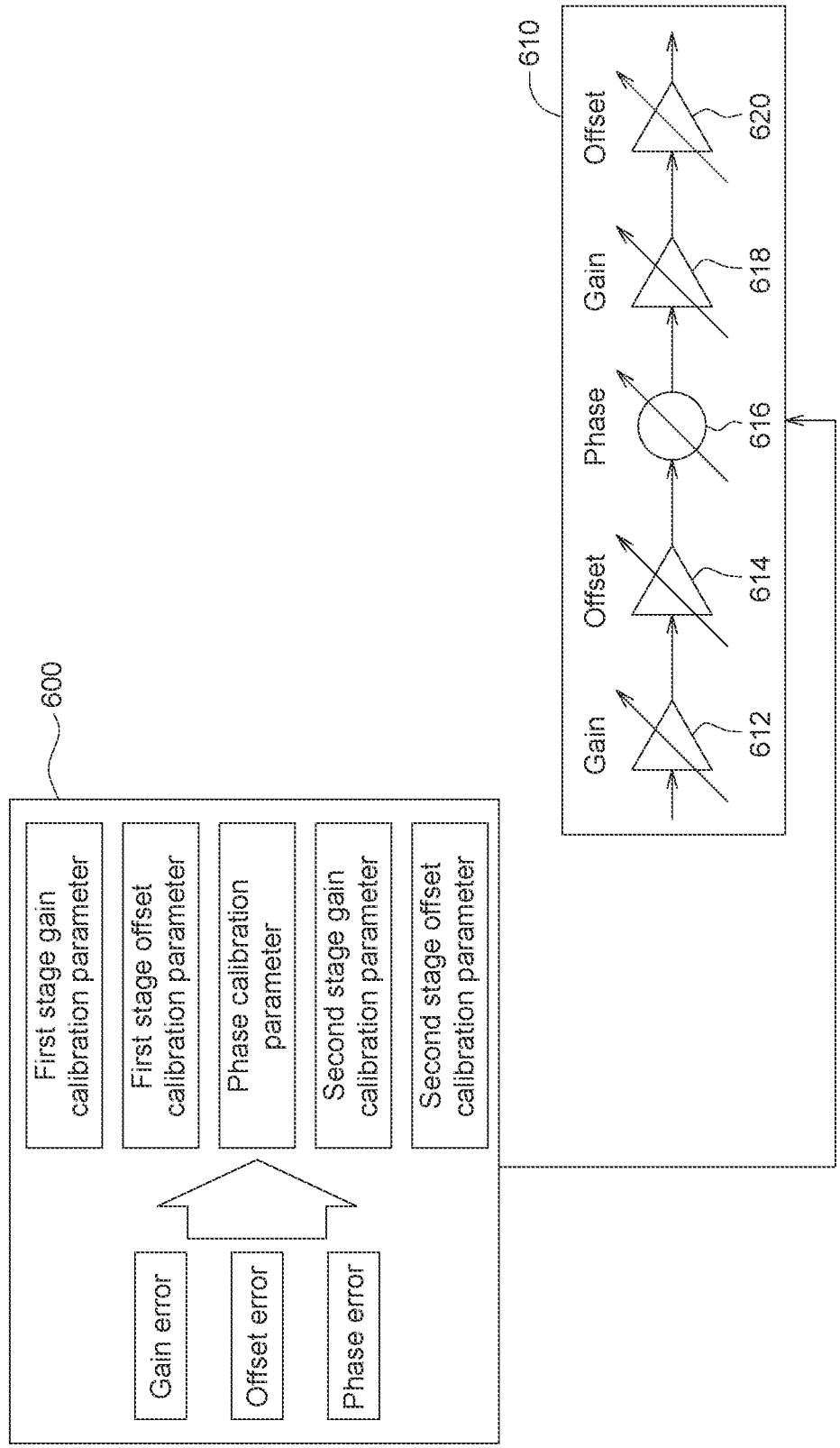
Figure 7:
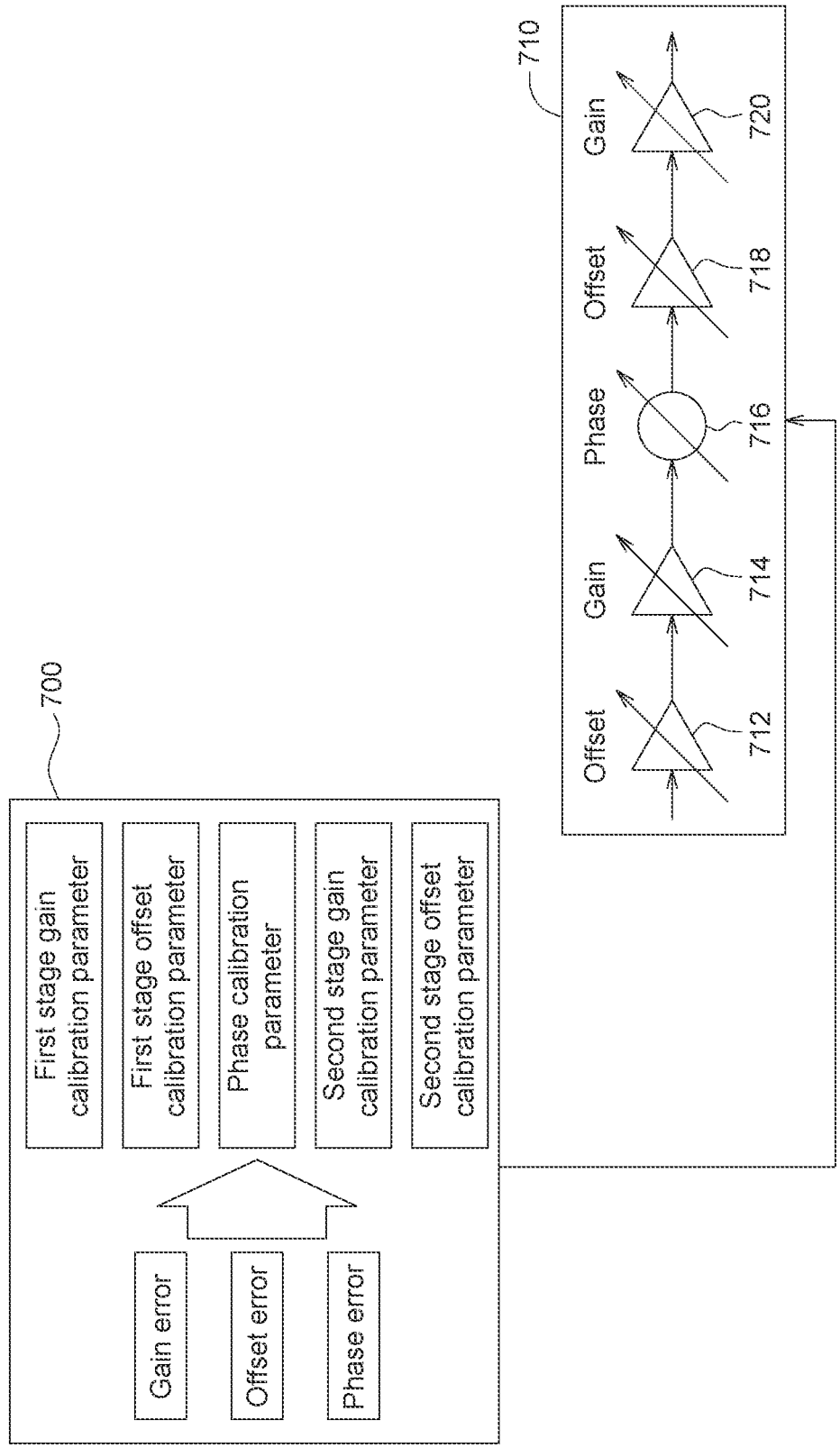

Please refer to FIG. 6, which illustrates a schematic diagram of a calibration parameter generator and an encoder calibration according to another embodiment of the present disclosure. In this embodiment, the calibration parameter generator 600 generates a first stage gain calibration parameter, a first stage offset calibration parameter, a phase calibration parameter, and a second stage gain calibration parameters and a second-stage offset calibration parameter according to the gain error, the offset error, and the phase error. The encoder 610 sequentially performs first-stage gain calibration 612 according to the first-stage gain calibration parameters, performs first-stage offset calibration 614 according to the first-stage offset calibration parameters, performs phase calibration 616 according to the phase calibration parameters, and performs phase calibration 616 according to the first-stage offset calibration parameters, performs a second-stage gain calibration 618 according to The second-stage gain calibration parameter and performs a second-stage offset calibration 620 according to the second-stage offset calibration parameter. In other words, the calibration for at least one of gain, offset, and phase can be divided into multiple stages, but it must comply with "After the phase calibration is completed, at least one gain calibration and one offset calibration are required.". It should be noted that in other embodiments, the number of divisions may be two or more. In addition, as mentioned above, the order of gain calibration and offset calibration can be reversed. As shown in FIG. 7, the first-stage offset calibration 712 may be performed first, and then the first-stage gain calibration 714 may be performed. Similarly, the second-stage offset calibration 718 may be performed first, and then the second-stage gain calibration 720 may be performed.

By observing the Lissajous curve synthesized by the sine and cosine waves in the rotation information of the motor calibrated by the encoder calibration method of the present disclosure, it can be found that the Lissajous curve synthesized by the sine wave and cosine wave in the rotation information will appear a stable circle, and a center of the circle is at a origin, rather than an ellipse whose center is not aligned with the origin. This means that the calibration effect can achieve stable convergence.

The servo motor and encoder calibration method proposed by the present disclosure allows the calibration result to converge stably by performing at least one gain calibration and one offset calibration after the phase calibration is completed, thereby reducing the time spent on the calibration, and improve the correctness of the calibration at the same time.

In summary, although the present disclosure has been disclosed in the above embodiments, it is not intended to limit the present disclosure. Those with ordinary knowledge in the technical field of the present disclosure can make various changes and modifications without departing from the spirit and scope of the present disclosure. Therefore, the scope of protection of the present disclosure shall be subject to those defined by the attached patent scope.

What is claimed is:

1. An encoder calibration method for servo motors, including:
   calculating a gain error, an offset error and a phase error, by an error calibration block, according to a first signal and a second signal output by an encoder;
   calculating at least one gain calibration parameter, at least one offset calibration parameter, and at least one phase calibration parameter according to the gain error, the offset error, and the phase error by the error calibration block; and
   performing calibration sequentially, by the encoder, on gain, offset and phase of the first signal and the second signal according to at least one gain parameter, the at least one offset calibration parameter, and at least one phase calibration parameter,
   wherein performing at least one gain calibration and one offset calibration are performed after a phase calibration is completed.

2. The encoder calibration method according to claim 1, wherein performing sequentially calibration, by the encoder, on gain, the offset and phase of the first signal and the second signal according to the at least one gain parameter, the at least one offset calibration parameter, and the at least one phase calibration parameter, wherein between at least one gain calibration and one offset calibration are performed after the phase calibration is completed, the gain calibration and the offset calibration can be reversed in order.

3. The encoder calibration method according to claim 1, wherein the at least one gain calibration parameter includes a first-stage gain calibration parameter and a second-stage gain calibration parameter, and the at least one offset calibration parameter includes a first-stage offset calibration parameter and a second-stage offset calibration parameter.

4. The encoder calibration method according to claim 3, wherein performing sequentially, by the encoder, a first-stage gain calibration and a first-stage offset calibration according to the first-stage gain calibration parameter and the first-stage offset calibration parameter;
   performing the phase calibration according to the at least one phase parameter; and
   performing a second-stage gain calibration and a second-stage offset calibration according to the second-stage gain calibration parameter and the second-stage offset calibration parameter.

5. The encoder calibration method according to claim 1, further including:
   driving and controlling a motor, by a drive control block, according to the first signal after calibration and the second signal after calibration, wherein a Lissajous curve synthesized by a sine wave and a cosine wave in a rotation information of the motor is a circle with a center coincident with a origin.

6. A servo motor, including:
   a motor, including a detecting means for detecting a rotation information of the motor;
   an encoder coupled to the motor for generating a first signal and a second signal according to the rotation information; and
   a driving circuit, including an error calibration block, coupled to the encoder, configured to calculate a gain error, an offset error and a phase error according to the first signal and the second signal; and calculating at least one gain calibration parameter, at least one offset calibration parameter, and at least one phase calibration parameter according to the gain error, the offset error and the phase error,
   wherein the encoder sequentially performs calibration on gain, offset, and phase of the first signal and the second signal according to the at least one gain parameter, the at least one offset calibration parameter, and the at least one phase calibration parameter,
   wherein performs at least one gain calibration and one offset calibration are performed after a phase calibration is completed.

7. The servo motor according to claim 6, wherein the gain calibration and the offset calibration can be reversed in order.

8. The servo motor according to claim 6, wherein the at least one gain calibration parameter includes a first-stage gain calibration parameter and a second-stage gain calibration parameter, and the at least one offset calibration parameter includes a first-stage offset calibration parameters and a second-stage offset calibration parameter.

9. The servo motor according to claim 8, wherein the encoder performs sequentially a first-stage gain calibration and a first-stage offset calibration according to the first-stage gain calibration parameter and the first-stage offset calibration parameter, and performs the phase calibration according to the at least one phase parameter, and performs a second-stage gain calibration and a second-stage offset calibration according to the second-stage gain calibration parameter and the second-stage offset calibration parameter.

10. The servo motor according to claim 6, wherein the drive circuit further includes a drive control block, the drive control block drives and controls the motor according to the first signal after calibration and the second signal after calibration; a Lissajous curve synthesized by a sine wave and a cosine wave in the rotation information after the motor is controlled is a circle with a center coincident a origin.

* * * * *